United States Patent
Takayama et al.

(10) Patent No.: US 7,276,465 B2
(45) Date of Patent: Oct. 2, 2007

(54) ERASABLE IMAGE FORMING MATERIAL

(75) Inventors: Satoshi Takayama, Kawasaki (JP); Kenji Sano, Tokyo (JP); Takeshi Gotanda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/266,326

(22) Filed: Nov. 4, 2005

(65) Prior Publication Data

US 2006/0111237 A1    May 25, 2006

(30) Foreign Application Priority Data

Nov. 8, 2004    (JP)    ............................ 2004-323113

(51) Int. Cl.
    B41M 5/327    (2006.01)
(52) U.S. Cl. ................ 503/221; 106/31.22; 106/31.23; 503/201; 503/209; 503/215
(58) Field of Classification Search ...................... None
    See application file for complete search history.

(56) References Cited

U.S. PATENT DOCUMENTS

| | | | |
|---|---|---|---|
| 5,849,651 A | 12/1998 | Takayama et al. | |
| 5,922,115 A | 7/1999 | Sano et al. | |
| 6,010,808 A | 1/2000 | Naito et al. | |
| 6,203,603 B1 | 3/2001 | Takayama et al. | |
| 6,248,692 B1 | 6/2001 | Sano et al. | |
| 6,313,066 B1 | 11/2001 | Takayama | |
| 6,326,332 B1 | 12/2001 | Takayama | |
| 6,329,317 B1 | 12/2001 | Takayama et al. | |
| 2005/0159311 A1 | 7/2005 | Sano et al. | |
| 2005/0191082 A1 | 9/2005 | Takayama et all. | |
| 2005/0221206 A1 | 10/2005 | Takayama et al. | |
| 2006/0111237 A1 | 5/2006 | Takayama et al. | |

FOREIGN PATENT DOCUMENTS

| | | |
|---|---|---|
| EP | 0 189 760 A1 | 8/1986 |
| EP | 0 980 028 A1 | 2/2000 |
| EP | 0 987 123 A2 | 3/2000 |
| EP | 1 041 447 A1 | 10/2000 |
| JP | 60-255482 | 12/1985 |
| JP | 1-138275 | 5/1989 |
| JP | 2000-284520 | 10/2000 |

OTHER PUBLICATIONS

U.S. Appl. No. 11/532,786, filed Sep. 18, 2006, Gotanda, et al.
U.S. Appl. No. 11/532,738, filed Sep. 18, 2006, Takayama, et al.

*Primary Examiner*—Bruce H. Hess
(74) *Attorney, Agent, or Firm*—Oblon, Spivak, McClelland, Maier & Neustadt, P.C.

(57) ABSTRACT

An erasable image forming material includes a color former, a developer, and a binder resin, the color former containing Crystal Violet Lactone and a specific fluorane compound can enhance light fastness as well as heat decolorizing performance.

12 Claims, 2 Drawing Sheets

ERASABLE IMAGE FORMING MATERIAL

CROSS-REFERENCE TO RELATED APPLICATIONS

This application is based upon and claims the benefit of priority from prior Japanese Patent Application No. 2004-323113, filed Nov. 8, 2004, the entire contents of which are incorporated herein by reference.

BACKGROUND OF THE INVENTION

1. Field of the Invention

The present invention relates to an erasable image forming material.

2. Description of the Related Art

Forest conservation is an essential requirement to maintain the terrestrial environment and suppress the greenhouse effect caused by $CO_2$. In order to minimize additional tree trimming and to keep balance with forest regeneration including tree planting, it is important how to utilize the existing paper resources efficiently.

Currently, paper resources are "recycled" by recovering paper fibers from used paper through a deinking step of removing image forming materials printed on the used paper, remaking paper fibers to manufacture recycled paper with low paper quality, and using the recycled paper according to the purpose. Thus, problems of a high cost of the deinking step and possibility of new environmental pollution by waste fluid treatment are pointed out.

On the other hand, "reuse" of a hard copy has been put into practice through erasure of images, for example, by using an eraser for pencil images and a correcting fluid for ink images. Here, "reuse" in which a paper sheet is repeatedly used for the same purpose with preventing deterioration of paper quality as much as possible is different from "recycling" in which a paper sheet with deteriorated quality is used for other purposes. Now, the "reuse" can be said to be more important concept from a viewpoint of conservation of paper resources. If effective "reuse" at each "recycling" stage is performed, additional waste of paper resources can be minimized. Recently, for example, a rewritable paper has been proposed, which is a special paper intended to reuse hard copy paper. Use of the rewritable paper technology enables the paper to be "reused" 100 times or more if paper damage such as a wrinkle and fold due to use can be ignored, which greatly enhances the efficient use of paper resources.

However, the rewritable paper is a special paper which can be "reused" but cannot be "recycled". The rewritable paper is also defective in that recording techniques other than thermal recording cannot be applied to.

The present inventors have paid their attention to a phenomenon caused by a system of a color former and a developer that a colored state is realized when interaction between the color former and the developer is increased and a decolorized state is realized when the interaction is decreased. Thus, the inventors have proposed, as paper reuse techniques, image forming materials of a composition system comprising a color former, a developer and a decolorizing agent. The image forming materials can exhibit stably a colored state around room temperature and can retain a decolorized state for a long time at practical temperatures by treatment with heat or a solvent. The inventors have also proposed image decolorizing processes and image decolorizing apparatuses for the image forming materials.

These image forming materials have advantages of high stability of colored and decolorized states of the images, highly safety in view of materials, applicability to electrophotography toners, liquid inks, ink ribbons and writing instruments, and feasibility of large-scale decolorizing treatment, which cannot be realized in any prior art.

The present inventors have further found that cellulose which is a constituent element of "paper" also has the decolorizing function, and proposed that even an image forming material not containing a decolorizing agent can be decolorized by treatment with heat or a solvent in applications of using paper for a recording medium.

For example, Jpn. Pat. Appln. KOKAI Publication No. 2000-284520 discloses that, by using an image forming material containing a color former, a developer and a binder resin, a clear image can be formed and the image can be decolorized sufficiently. In this image forming material, the equilibrium between the color former and the developer is shifted to the non-coloring side when the material is heated, and the state shifted to the non-coloring side can be maintained by the binder resin when the material is cooled, so that the image can be decolorized.

Examples of the color former (known as a leuco dye) contained in the image forming materials include electron donating organic materials such as leucoauramines, diarylphthalides, polyarylcarbinols, acylauramines, arylauramines, rhodamine B lactams, azaphthalides, spiropyrans, and fluoranes.

Among leuco dyes, Crystal Violet Lactone (CVL) particularly shows an excellent heat decolorizing performance as compared with other leuco dyes. However, CVL has a problem that it is easily decomposed by light. Other leuco dyes may be excellent in light fastness, but do not show excellent heat decolorizing performance as compared with CVL.

BRIEF SUMMARY OF THE INVENTION

An erasable image forming material according to an aspect of the present invention comprises a color former, a developer, and a binder resin, the color former containing Crystal Violet Lactone and a fluorane compound represented by the following formula (1) or a derivative thereof:

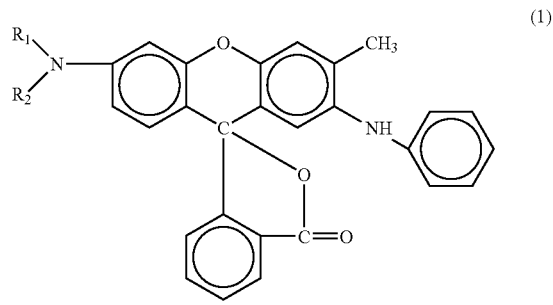

(1)

where $R_1$ is an alkyl group or a hydrogen atom, and $R_2$ is an alkyl group or a hydrogen atom.

The color former preferably contains not less than 75 wt % of Crystal Violet Lactone. The fluorane compound is preferably 2-anilino-6-(N-ethyl-N-isopentylamino)-3-methylfluorane or 2-anilino-6-(N-ethyl-N-isobutylamino)-3-methylfluorane.

DETAILED DESCRIPTION OF THE INVENTION

Figure 1:
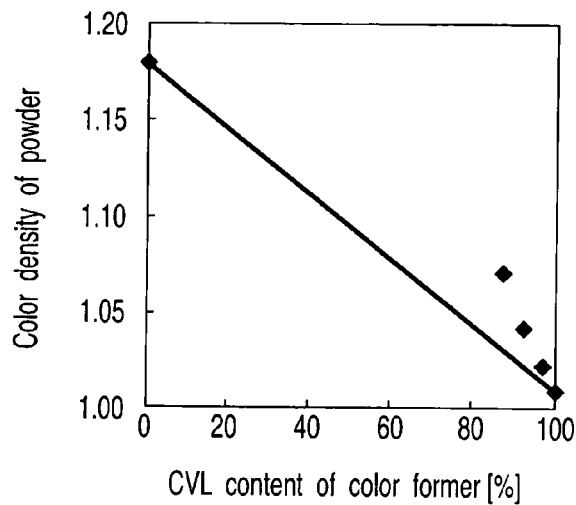
FIG. 1 is a graph showing a relationship between composition of the color former and color density of powder in Example 1.

The present invention will be specifically described below.

The inventors have found that, in an erasable image recording material comprising a color former, a developer, and a binder resin, use of a specific leuco dye together with Crystal Violet Lactone (CVL) as the color former can improve the light fastness without lowering the heat decolorizing performance of CVL.

The erasable image forming material according to embodiments of the present invention comprises a color former, a developer, and a binder resin. The image forming material is prepared by dispersing the color former and the developer in the binder resin. In this state, the color former interacts with the developer, and hence they are colored. If such an image forming material in a form of powder is used in electrophotography or else, the material can form a clear image on a paper sheet.

The image forming material according to embodiments of the present invention can be decolorized (erased) by heating. Decolorizing of the image forming material occurs due to loss of interaction between the color former and the developer as the binder resin selectively dissolves the color former on heating. That is, when the paper sheet is heated, the color former is soluble in the binder resin, but the developer lowers affinity with the binder resin.

In embodiments of the present invention, the color former contains CVL and a fluorane compound represented by the following formula (1) or a derivative thereof. In particular, a black fluorane compound or derivative thereof is preferable.

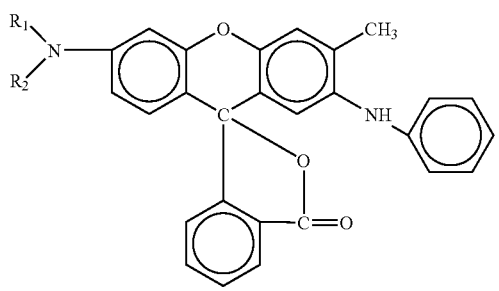

(1)

where $R_1$ is an alkyl group or a hydrogen atom, and $R_2$ is an alkyl group or a hydrogen atom.

Examples of the fluorane compound include, for example,
2-anilino-6-(N,N-diethylamino)-3-methylfluorane,
2-anilino-6-(N,N-dipropylamino)-3-methylfluorane,
2-anilino-6-(N,N-dibutylamino)-3-methylfluorane,
2-anilino-6-(N,N-dipentylamino)-3-methylfluorane,
2-anilino-6-(N,N-dihexylamino)-3-methylfluorane,
2-anilino-6-(N,N-dioctylamino)-3-methylfluorane,
2-anilino-6-(N,N-diisopropylamino)-3-methylfluorane,
2-anilino-6-(N,N-diisobutylamino)-3-methylfluorane,
2-anilino-6-(N,N-diisopentylamino)-3-methylfluorane,
2-anilino-6-(N-methyl-N-ethylamino)-3-methylfluorane,
2-anilino-6-(N-methyl-N-isopropylamino)-3-methylfluorane,
2-anilino-6-(N-methyl-N-isobutylamino)-3-methylfluorane,
2-anilino-6-(N-methyl-N-isopentylamino)-3-methylfluorane,
2-anilino-6-(N-methyl-N-propylamino)-3-methylfluorane,
2-anilino-6-(N-methyl-N-butylamino)-3-methylfluorane,
2-anilino-6-(N-methyl-N-pentylamino)-3-methylfluorane,
2-anilino-6-(N-methyl-N-hexylamino)-3-methylfluorane,
2-anilino-6-(N-methyl-N-octylamino)-3-methylfluorane,
2-anilino-6-(N-ethyl-N-propylamino)-3-methylfluorane,
2-anilino-6-(N-ethyl-N-isobutylamino)-3-methylfluorane,
2-anilino-6-(N-ethyl-N-pentylamino)-3-methylfluorane,
2-anilino-6-(N-ethyl-N-2-methylbutylamino)-3-methylfluorane,
2-anilino-6-(N-ethyl-N-2-ethylpropyl)amino)-3-methylfluorane, and
2-anilino-6-(N-ethyl-N-hexylamino)-3-methylfluorane.

Derivatives of the fluorane compound include a fluorane compound derivative represented by the following formula (2), a fluorane compound derivative represented by the following formula (3), and a fluorane compound derivative represented by the following formula (4).

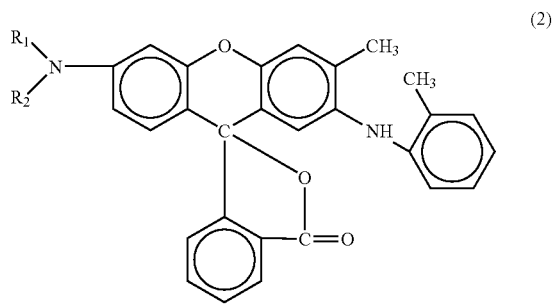

(2)

where $R_1$ is an alkyl group or a hydrogen atom, and $R_2$ is an alkyl group or a hydrogen atom.

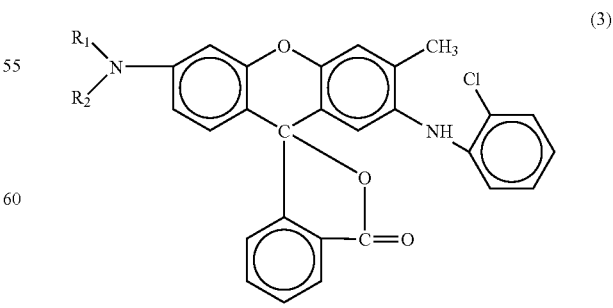

(3)

where $R_1$ is an alkyl group or a hydrogen atom, and $R_2$ is an alkyl group or a hydrogen atom.

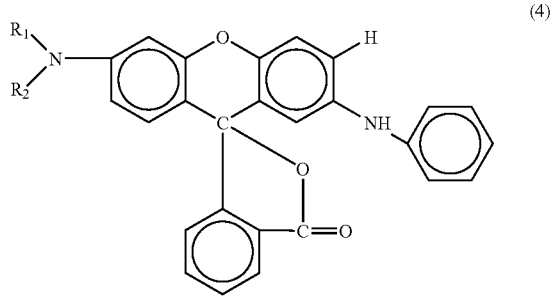

(4)

where $R_1$ is an alkyl group or a hydrogen atom, and $R_2$ is an alkyl group or a hydrogen atom.

The ratio of the fluorane compound in the color former is preferably 0.01 wt % or more and 25 wt % or less. If the fluorane compound is contained more than 25 wt % in the color former, decolorizing performance of the image forming material is lowered. If the fluorane compound is contained less than 0.01 wt % in the color former, the fluorane compound may be insufficiently dispersed and unevenly distributed in the image forming material.

The developer interacts with the color former so as to develop a color of the color former. Examples of the developer includes metal phenolates, carboxylic acids, metal carboxylates, benzophenones, sulfonic acids, metal sulfonates, phosphoric acids, metal phosphates, acidic phosphoric esters, acidic phosphoric ester metal salts, phosphorous acids, and metal phosphites. These developers can be used alone or in a combination of two or more species. Specific examples of the developer include gallic acid; gallate such as methyl gallate, ethyl gallate, n-propyl gallate, i-propyl gallate, and i-butyl gallate; dihydroxybenzoic acid and its ester such as 2,3-dihydroxybenzoic acid, and methyl 3,5-dihydroxybenzoate; hydroxyacetophenones such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; hydroxybenzophenones such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenols such as 2,4'-biphenol, and 4,4'-biphenol; and polyhydric phenols such as 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)-bis(1,2-benzenediol)], 4,4',4''-ethylidenetrisphenol, 4,4'-(1-methylethylidene)bisphenol, and methylene tris-p-cresol. Examples of the most preferable developer are gallate such as methyl gallate, ethyl gallate, n-propyl gallate, i-propyl gallate, and butyl gallate; and hydroxybenzophenones such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone.

The binder resin has properties of dispersing the color former and developer in a colored state therein when preparing the image forming material, dissolving the color former without affinity with the developer when heated.

Examples of the binder resin include, for example, polystyrene, a polystyrene derivative, and a styrene copolymer. Specific examples of a styrene-based monomer used in preparing these resins include styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. These styrene-based monomers may be used in combination.

A styrene monomer may be copolymerized with a monomer having a polar group. Examples of the monomer having a polar group include methyl methacrylate, ethyl methacrylate, isobutyl methacrylate, cyclohexyl methacrylate, ethylhexyl methacrylate, lauryl methacrylate, stearyl methacrylate, vinyl acetate, vinyl propionate, methacrylonitrile, dimethyl malate, diethyl malate, dimethyl fumarate, dibutyl fumarate, dimethyl itaconate, butyl itaconate, methyl vinyl ether, ethyl vinyl ether, n-butyl vinyl ether, and isobutyl vinyl ether. These vinyl monomers having a polar group may be used alone or in a combination of two or more species.

Examples of preferable binder resin formed of a copolymer include styrene/n-butyl methacrylate, styrene/isobutyl methacrylate, styrene/ethyl acrylate, styrene/n-butyl acrylate, styrene/methyl methacrylate, styrene/glycidyl methacrylate, styrene/dimethylaminoethyl methacrylate, styrene/diethylaminoethyl methacrylate, styrene/diethylaminopropyl acrylate, styrene/2-ethylhexyl acrylate, styrene/butylacrylate-N-(ethoxymethyl)acrylamide, styrene/ethyleneglycol methacrylate, styrene/4-hexafluorobutyl methacrylate, styrene/butadiene copolymer, acrylonitrile/acrylic rubber/styrene terpolymer, acrylonitrile/styrene/acrylate terpolymer, styrene/acrylonitrile copolymer, acrylonitrile/chlorinated polystyrene/styrene terpolymer, acrylonitrile/ethylene vinyl acetate/styrene terpolymer, styrene/p-chlorostyrene copolymer, styrene/propylene copolymer, styrene/malate copolymer, and styrene/maleic anhydride copolymer. The acrylate monomer to be copolymerized with styrene may be used alone or in a combination of two or more species. A copolymer prepared by copolymerizing styrene with butadiene, malate or chloroprene may be used, where such a component is preferably used in a ratio of 10 wt % or less of the binder resin. A polymer of an acrylate monomer may be used with polystyrene. In this case, the polyacrylate component may be either a homopolymer or copolymer. A copolymer prepared by copolymerizing acrylate with butadiene, malate or chloroprene in a ratio of 10 wt % or less may be used.

Generally, thermal properties of a binder resin for toner are represented by the values of a softening point and a glass transition point, where the softening point ranges from 60 to 190° C. and the glass transition point ranges from 20 to 110° C. The binder resin used in an erasable toner made of the image forming material according to an embodiment of the present invention preferably has a softening point between 95 and 160° C. and a glass transition point between 50 and 80° C. If the softening point and glass transition point are higher than the above ranges, the toner fixing temperature may become higher, which may cause decolorizing of the erasable toner when fixing. If the softening point and glass transition point are lower than the above ranges, the toner storage stability becomes poor. The softening point can be measured with a flow tester. The glass transition point can be measured with a differential scanning calorimeter (DSC). For example, the softening temperature can be determined as a temperature ($T_{1/2}$) at the time when the flow-out amount of a sample reaches the half value of the sample amount using a flow tester (for example, CFT-500 manufactured by Shimadzu Corp) under the following conditions: the nozzle size is 1.0 mmϕ×10.0 mm, the load is 30 kgf, the temperature rise is 3° C./min, and sample amount is 1.0 g. The glass transition point can be determined as a temperature calculated as a shoulder value after melt-quench with DSC. The shoulder value is referred to as "an intermediate point between a start point and an end point of specific heat change" in a vicinity of an inflection point of change in specific heat.

In embodiments of the present invention, the amount of the polar group contained in the binder resin is preferred to be small. The binder resin with a small amount of polar group brings higher color density when an image forming material is prepared through kneading. The binder resin with a small amount of polar group also shows higher miscibility with the color former when the image forming material is heated. Therefore, it is preferred to use the binder resin with a small amount of polar group since it leads to higher contrast between colored state and decolorized state.

The binder resin which provides higher contrast between the colored state and decolorized state includes a nonpolar resin such as polystyrene and polyolefin. A preferable binder resin used for a toner is a styrene-butadiene copolymer, a styrene-propylene copolymer, and derivatives thereof.

Various additives besides the color former, developer and binder resin when an image forming material according to embodiments of the present invention is used as a toner will be described below.

A charge control agent may be added to adjust charging characteristics of the toner. The charge control agent is preferred not to leave the color of the charge control agent when decolorized. Accordingly, the charge control agent is preferred to be colorless or transparent. Examples of a negative charge control agent include E-89 available from Orient Kagaku K.K. (calixarene derivative), N-1, N-2, N-3 (all are phenol-based compounds) and LR147 (boron-based compound) available from Japan Carlit Co., Ltd., and FCA-1001N (styrene-sulfonic acid-based resin) available from FUJIKURA KASEI CO. LTD. In particular, E-89 and LR147 are preferred. Examples of a positive charge control agent include TP-302 (CAS #116810-46-9) and TP-415 (CAS #17324-25-2) available from Hodogaya Chemical Co., Ltd., P-51 (quaternary amine compound) and AFP-B (polyamine oligomer) available from Orient Kagaku K.K., and FCA-201PB (styrene-acrylic quaternary ammonium salt resin) available from FUJIKURA KASEI CO. LTD.

A wax may be added to control fixing property. The wax to be added to the image forming material according to embodiments of the present invention is preferably formed of a component not coloring the color former. Examples of the wax include higher alcohol, higher ketone, and higher aliphatic ester, whose acid value is preferably 10 mg KOH/g or less. The wax preferably has a weight-average molecular weight of $10^2$ to $10^5$, more preferably $10^2$ to $10^4$. As far as the weight-average molecular weight is within the above range, low molecular-weight polypropylene, low molecular-weight polyethylene, low molecular-weight polybutylene, and low molecular-weight polyalkane may be used. The addition amount of wax is preferably 0.1 to 30 parts by weight, more preferably 0.5 to 15 parts by weight. In the case of a toner fixed by heat roll, the wax is added to impart releasing property from the heat roll, where the addition amount of wax is preferably 0.5 to 15 parts by weight. In the case of a toner fixed by pressure, the wax can be used as a principal component of the image forming material, where the wax forms the core part in a microcapsule structure.

In the image forming material according to embodiments of the present invention, external additives may be added, if required, to control flowability, shelf life, anti-blocking property, and grinding property for photosensitive body. Examples of the external additives include silica fine particles, metal oxide fine particles, and cleaning auxiliary. Examples of the silica fine particles include silicon dioxide, sodium silicate, zinc silicate, and magnesium silicate. Examples of the metal oxide fine particles include zinc oxide, magnesium oxide, zirconium oxide, strontium titanate, and barium titanate. Examples of the cleaning auxiliary include resin fine powder such as polymethyl methacrylate, polyvinylidene fluoride, and polytetrafluoroethylene.

These external additives may be subjected to surface treatment for hydrophobing. External additives used for toner are usually subjected to hydrophobing treatment. In the case of negative charging, a hydrophobing agent such as a silane coupling agent, a titanium coupling agent and silicone oil may be used. In the case of positive charging, a hydrophobing agent such as an aminosilane-based one and silicone oil having amine in the side chain thereof may be used. The addition amount of the external additive is preferably 0.05 to 5 parts by weight, and more preferably 0.1 to 3.0 parts by weight to 100 parts by weight of toner. Silica particles used for toner generally has a mean particle size (as a primary particle) of 10 to 20 nm. Silica particles with mean particle size of about 100 nm may also be used. As to other material than silica, relatively large particles with a mean particle size of 0.05 to 3 μm are generally used.

Toner particles preferably have a volume average size of 6 to 20 μm; a content of particles of 5 μm or less in number distribution of 2 to 20% by number; a content of particles of 5 μm or less in volume distribution of 0 to 5% by volume; and a content of particles of 20 μm or more in volume distribution of 0 to 5% by volume. These values are measured with Coulter Multisizer (Coulter). The conductivity of the erasable toner is preferably $10^{11}$ to $10^{16}$ Ωcm, more preferably $10^{13}$ to $10^{15}$ Ωcm. In the case of two-component development, a carrier prepared by coating iron powder, ferrite or magnetite with a resin such as silicone or acrylic is used. The conductivities of these carriers are preferably $10^9$ Ωcm or less for iron powder, about $10^6$ to $10^{15}$ Ωcm for ferrite, and $10^{13}$ Ωcm or more for magnetite. The conductivity of a carrier prepared by dispersing magnetic powder pulverized to about 50 μm in a resin is preferably $10^{13}$ Ωcm or more. The conductivity is measured in such a method of forming a toner into a circular tablet of 20 mm in diameter and 1 mm in thickness, and applying voltage of 1V·at 1 kHz to the tablet.

The erasable image forming material is prepared by mixing and dispersing the color former, developer, and other components in the binder resin.

Methods of mixing and dispersing the color former and developer in the binder resin includes a method in which the materials are dispersed in wet process using a solvent with a high-speed dissolver, a roll mill or a ball mill; or a method in which the materials are fused and kneaded with a roll, a pressurizing kneader, an internal mixer or a screw extruder. Examples of the mixer include a ball mill, a V-mixer, a Vorbeg mixer, and a Henschel mixer.

EXAMPLES

The results of experiments performed for evaluating light fastness and heat decolorizing performance of the erasable image forming materials according to the present invention will be described.

Example 1

To evaluate the heat decolorizing performance and light fastness, five types of toners were prepared using different color formers.

Five color formers each containing Crystal Violet Lactone (CVL) and/or 2-anilino-6-(N-ethyl-N-isopentylamino)-3-methylfluorane (leuco dye S-205 available from Yamada Kagaku Co., Ltd.) were prepared to have CVL contents of 100 wt %, 97.5 wt %, 92.5 wt %, 87.5 wt %, and 0 wt %, respectively.

Using these color formers, five toners were prepared as follows.

Four parts by weight of the color former, two parts by weight of ester gallate as a developer, five parts by weight of polypropylene wax as a wax component, 88 parts by weight of a styrene-butadiene copolymer as a binder resin, and one part by weight of LR-147 (available from Japan Carlit Co., Ltd.) as a charge control agent were mixed.

The mixture was kneaded with a Banbury mixer, and the kneaded product was ground with a grinder to prepare powder with an average particle size of 11 μm. Then, one part by weight of hydrophobic silica was added to 100 parts by weight of the resultant powder to prepare a blue toner for electrophotography.

The color density of powder before adding hydrophobic silica was measured. Specifically, power before addition of hydrophobic silica was put in a powder cell and then the color density of the powder was measured with a colorimeter (CR300 manufactured by Minolta).

FIG. 1 shows the relationship between the ratio of CVL in the color former and the color density of the powder. According to spectrum measurements of the color formers colored in an aqueous acetic acid solution, it has been found that a fluorane compound S-205 provides higher absorption than CVL. FIG. 1 shows that the color density of the power gradually becomes higher as the CVL content of the color former decreases (that is, S-205 content increases). The solid line in FIG. 1 is a straight line connecting the color density of the powder containing only S-205 and the color density of the powder containing only CVL. The powder containing CVL and S-205 theoretically should indicate the color density on the solid line in FIG. 1 calculated by proportionally distributing the color densities depending on the ratio of the two components. However, the powders containing CVL and S-205 as the color former show a higher color density than the solid line in FIG. 1 due to a synergistic effect. It is found from FIG. 1 that such a synergistic effect appears when the ratio of CVL in the color former is 97.5% or less.

Subsequently, the decolorizing performance was evaluated using the five toners. The procedure of the experiment for evaluation and the evaluation method are as follows.

Using the five prepared toners, square images having sides of 15 mm (hereinafter, referred to as solid patterns) were formed on two types of copy paper in 10 degrees of image density by means of a multi-function printer MFP (Primage 351 of TOSHIBA TEC CORPORATION). These images were used to as original images for evaluating decolorizing performance. The image density (ID) is the common logarithm of a reciprocal number of reflectance of the image. The image density (ID) of paper mentioned below is the common logarithm of a reciprocal number of reflectance of the paper itself.

Heat decolorizing was performed by heating the solid patterns printed on the copy paper for 2 hours at 130° C. in a thermostatic oven.

The decolorizing performance was evaluated by calculating the decolorizing rate. The decolorizing rate is calculated as follows. First, reflectance of the original image for evaluation printed on each copy paper is measured to calculate the original image density. Similarly, reflectance of an image after decolorizing (residual image) is measured to calculate the residual image density. A regression coefficient is calculated by setting a value obtained by subtracting a paper ID from an original ID before heat decolorizing, i.e., [(original ID–paper ID)], as an explanatory variable and a value obtained by subtracting a paper ID from a residual ID after heat decolorizing, i.e., [(residual ID–paper ID)], as a criterion variable in every paper for evaluation. The arithmetic mean of the regression coefficients of each paper thus obtained is calculated as a decolorizing rate.

The decolorizing rate represents an approximate ratio of the residual ID to the original ID, which implies that the smaller the value, the higher the heat decolorizing performance. For example, if the original ID is 1.0, the decolorizing rate of 0.05 means that the residual ID remaining after heat decolorizing is 0.05.

Figure 2:
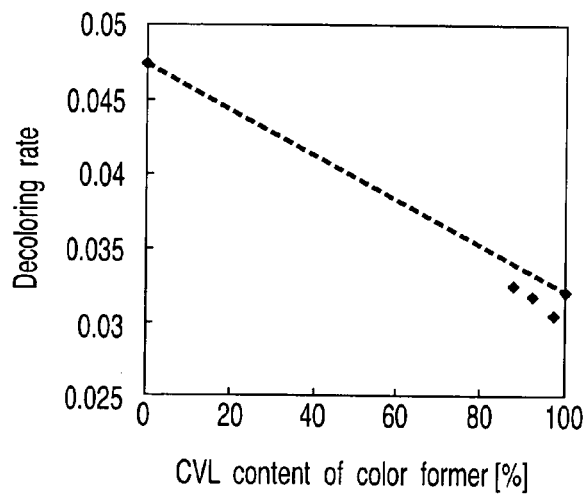
FIG. 2 is a graph showing a relationship between composition of the color former and heat decolorizing performance in Example 1.

FIG. 2 shows the relationship between the CVL content of the color former and the decolorizing rate. When the toner with the ratio of CVL in the color former of 0% (S-205 only) is compared with the toner with the ratio of CVL in the color former of 100% (CVL only), the decolorizing rate of the latter is considerably low. The broken line in FIG. 2 is a straight line connecting the decolorizing rate of the toner containing only S-205 and the decolorizing rate of the toner containing only CVL. The toner containing CVL and S-205 theoretically should show the decolorizing rate on the broken line in FIG. 2 calculated by proportionally distributing the decolorizing rates depending on the ratio of the two components. However, the toners containing CVL and S-205 as the color former show the decolorizing rate lower than the broken line in FIG. 2 due to a synergistic effect. It is found from FIG. 2 that the synergistic effect appears when the ratio of CVL in the color former is 87.5% or more.

Further, using original images of solid patterns of the five toners, experiments were performed for evaluating the light fastness.

The experiment was performed by accelerated test. The copy paper on which the original image was printed was exposed to a light source equivalent to a fluorescent lamp with illuminance of 15000 lux, and the changes of ID with elapsed time were measured to evaluate light fastness by a fading rate. The fading rate is calculated as follows. That is, an original ID and a faded ID are measured, an image retention rate is calculated according to the formula: [(original ID–faded ID)/original ID], and the fading rate is calculated according to the formula: [100–image retention rate] (%).

Figure 3:
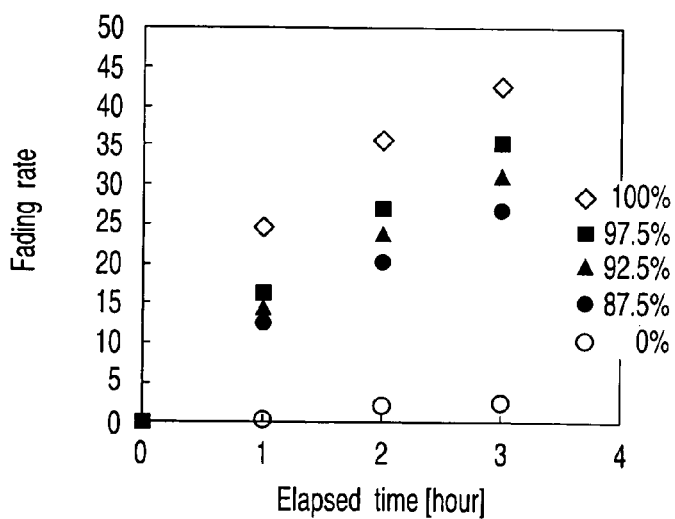
FIG. 3 is a graph showing light fastness of the color former in Example 1.

In the accelerated test, the two-hour light exposure (3000 lux·h) corresponds to light exposure for 5 days in an ordinary office in which lighting time using a light source with an average illuminance of 500 lux is supposed to be 12 hours a day. FIG. 3 shows the change in fading rate with respect to light exposure time for the five toners.

In FIG. 3, the fading rates after two hours will be compared. The fading rate after two hours is about 35% for the toner containing a color former of CVL 100% (CVL only), but it is about 27% for the toner containing a color former of CVL 97.5% (S-205 2.5%), and about 20% for the toner containing a color former of CVL 87.5% (S-205 12.5%). That is, the improvement of the fading rate is about 8% and about 15%, respectively.

Also, the toners containing the color former with a small amount of S-205, such as CVL 97.5% (and S-205 2.5%) and CVL 92.5% (and S-205 7.5%) can retain about 85% of the original image density after one-hour light exposure, which corresponds to light exposure for 2.5 days in an ordinary office condition of about 15000 lux·h.

In Example 1, it is found that toners excellent in both decolorizing performance and light fastness can be provided by setting the CVL ratio in the color former containing CVL and S-205 to the range of 87.5% to 97.5%.

Example 2

To evaluate the heat decolorizing performance and light fastness, six types of toners were prepared using different color formers.

Six color formers each containing Crystal Violet Lactone (CVL) and/or 2-anilino-6-(N-ethyl-N-isobutylamino)-3-methylfluorane (PSD-184 available from NIPPON SODA CO., LTD.) were prepared to have CVL contents of 100 wt %, 94 wt %, 88 wt %, 82 wt %, 75 wt %, and 0 wt %, respectively.

Using these color formers, six types of toners were prepared as follows.

4.15 parts by weight of a color former, two parts by weight of ester gallate as a developer, five parts by weight of polypropylene wax as a wax component, 87.85 parts by weight of a styrene-butadiene copolymer as a binder resin, and one part by weight of LR-147 (available from Japan Carlit Co., Ltd.) as a charge control agent were mixed.

The mixture was kneaded with three rolls, and the kneaded product was ground with a grinder to prepare powder with an average particle size of 11 μm. Then, one part by weight of hydrophobic silica was added to 100 parts by weight of the resultant powder to prepare a blue toner for electrophotography.

With respect to these toners, heat decolorizing performance and light fastness were evaluated in the same manner as in Example 1. Light fastness was evaluated in the same procedure as in Example 1, except that the light source used was a sunlamp with illuminance of 20000 lux.

Figure 4:
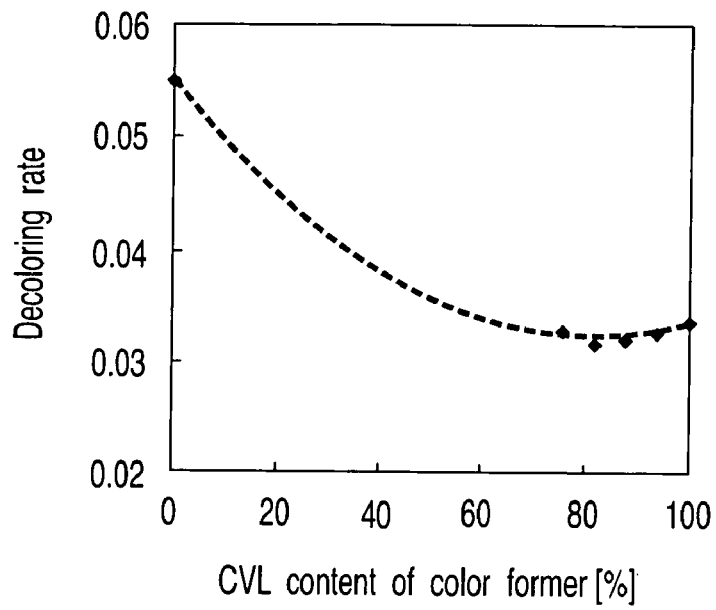
FIG. 4 is a graph showing a relationship between composition of the color former and heat decolorizing performance in Example 2.

FIG. 4 shows the relationship between the CVL content of the color former and the decolorizing rate. When the toner with the ratio of CVL in the color former of 0% (PSD-184 only) is compared with the toner with the ratio of CVL in the color former of 100% (CVL only), the decolorizing rate of the latter is considerably low. The toners containing CVL and PSD-184 show a more excellent decolorizing performance than the toner containing only CVL. It is found from FIG. 4 that excellent decolorizing performance can be provided when the ratio of CVL in the color former is 75% or more.

Figure 5:
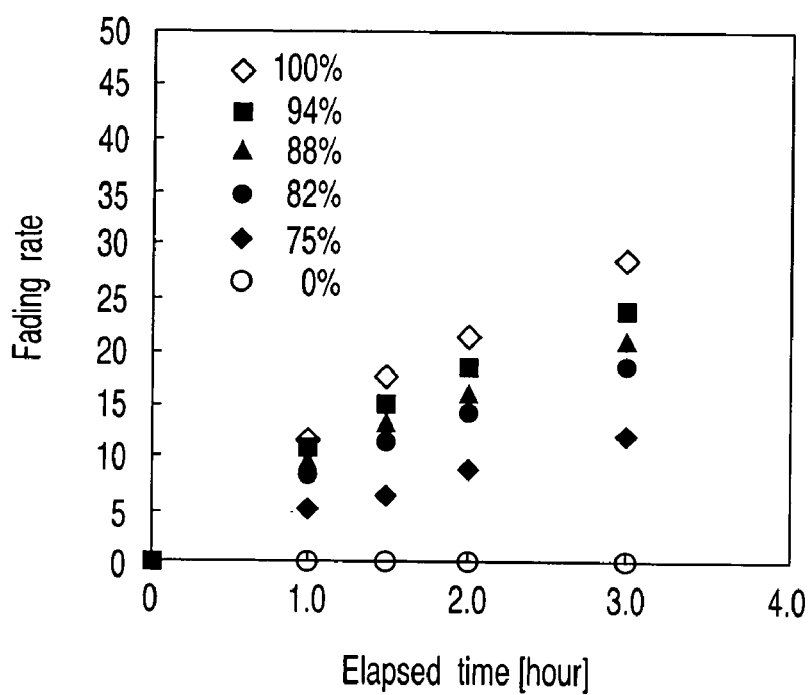
FIG. 5 is a graph showing a relationship between composition of the color former and light fastness in Example 2.

FIG. 5 shows the change in fading rate with respect to light exposure time for the six toners. The fading rate after 1.5 hours is about 17% for the toner containing a color former of CVL 100% (CVL only), but it is about 14% for the toner containing a color former of CVL 94% (PSD-184 6%), and about 6% for the toner containing a color former of CVL 88% (PSD-184 12%). That is, the improvement of the fading rate is about 3% and about 10%, respectively.

In Example 2, it is found that the toners excellent in both decolorizing performance and light fastness can be provided by setting the CVL ratio in the color former containing CVL and PSD-184 to the range of 75% to 94%.

From the results in Examples 1 and 2, it is found that the decolorizing performance and light fastness vary depending on the type of the fluorane compound added to the color former, the content of the color former, and the kneading process of the toner.

Comparative Example 1

Two color formers each containing 3,3-bis(1-n-butyl-2-methyl-indol-3-yl)phthalide (Red 40 available from YAMAMOTO CHEMICALS Inc.) and 2-anilino-6-(N,N-dipentylamino)-3-methylfluorane (available from Yamada Kagaku Co., Ltd.) were prepared to have Red. 40 content of 10 wt % and 30 wt %, respectively.

Using these color formers, two types of toners were prepared in the same manner as in Example 1, except that polystyrene was used as a binder resin, and that the particle size was adjusted to 10 μm. The color density of powder before adding hydrophobic silica was 0.986 in the powder with Red 40 ratio in the color former of 10 wt %, and 0.959 in the powder with Red 40 ratio in the color former of 30 wt %.

Using the two toners, decolorizing performance and light fastness were evaluated in the same manner as in Example 1. As a result, improvement of decolorizing performance and light fastness as in Example 1 was not observed.

As described above, in the toner containing a color former having a fluorane compound added to CVL, improvement of decolorizing performance and light fastness was observed. However, in the toner of containing a color former having a fluorane compound added to other leuco dye than CVL, improvement of decolorizing performance and light fastness was not observed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An erasable image forming material comprising a color former, a developer, and a binder resin, the color former containing 75 to 97.5 wt % Crystal Violet Lactone and a balance of a fluorane compound represented by the following formula (1) or a derivative thereof:

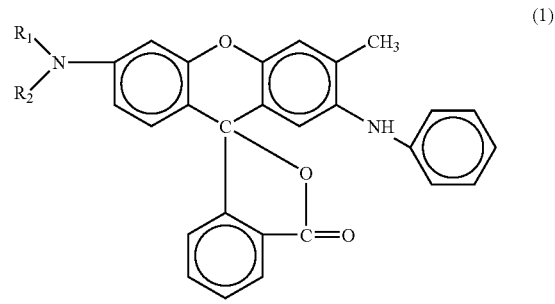

where $R_1$ is an alkyl group or a hydrogen atom, and $R_2$ is an alkyl group or a hydrogen atom.

2. The erasable image forming material according to claim 1, wherein the derivative of the fluorane compound is selected from the group consisting of compounds represented by the following formulae (2) and (3):

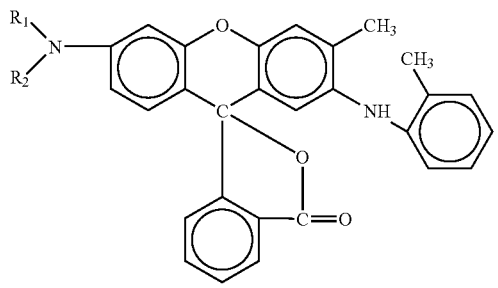
(2)

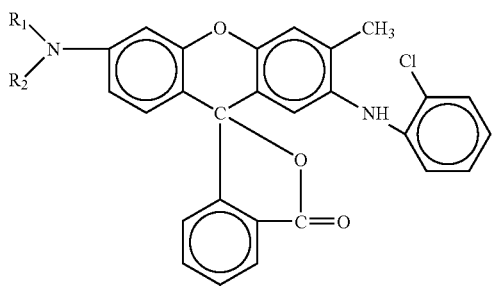
(3)

where $R_1$ is an alkyl group or a hydrogen atom, and $R_2$ is an alkyl group or a hydrogen atom.

3. The erasable image forming material according to claim 2, wherein the color former consists of Crystal Violet Lactone and a fluorane compound represented by formulae (2) or (3) in amounts that provide a synergistic color density, a synergistic decolorizing rate, or both a synergistic color density and synergistic decolorizing rate.

4. The erasable image forming material according to claim 1, wherein the fluorane compound is selected from the group consisting of 2-anilino-6-(N-ethyl-N-isopentylamino)-3-methylfluorane and 2-anilino-6-(N-ethyl-N-isobutylamino)-3-methylfluorane.

5. The erasable image forming material according to claim 1, wherein the binder resin is selected from the group consisting of a styrene-butadiene copolymer and polystyrene.

6. The erasable image forming material according to claim 1, wherein the developer is selected from the group consisting of gallate and hydroxy benzophenone.

7. The erasable image forming material according to claim 1, further comprising a wax component.

8. The erasable image forming material according to claim 1, further comprising a charge control agent.

9. The erasable image forming material according to claim 1, further comprising an external additive in a form of fine particles.

10. The erasable image forming material according to claim 1, wherein the color former contains 87.5 to 97.5 wt % of Crystal Violet Lactone and a balance of 2-anilino-6-(N-ethyl-N-isopentylamino)-3-methylfluorane.

11. The erasable image forming material according to claim 1, wherein the color former contains 75 to 94 wt % of Crystal Violet Lactone and a balance of 2-anilino-6-(N-ethyl-N-isobutylamino)-3-methylfluorane.

12. The erasable image forming material according to claim 1, wherein the color former consists of Crystal Violet Lactone and a fluorane compound represented by formula (1) in amounts that provide a synergistic color density, a synergistic decolorizing rate, or both a synergistic color density and synergistic decolorizing rate.

* * * * *